United States Patent
Saito et al.

(10) Patent No.: US 6,280,668 B1
(45) Date of Patent: Aug. 28, 2001

(54) SYNTHETIC RESIN COMPOSITION AND MOLDED ARTICLE THEREOF

(75) Inventors: Tatsuya Saito; Takayuki Ishikawa, both of Fujinomiya (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/043,892

(22) PCT Filed: Oct. 22, 1996

(86) PCT No.: PCT/JP96/03063

§ 371 Date: Mar. 30, 1998

§ 102(e) Date: Mar. 30, 1998

(87) PCT Pub. No.: WO97/15631

PCT Pub. Date: May 1, 1997

(30) Foreign Application Priority Data

Oct. 23, 1995 (JP) .................................................... 7-274184

(51) Int. Cl.$^7$ .............................. B29C 7/00; C08K 5/16; C08K 5/54
(52) U.S. Cl. ...................... 264/108; 264/140; 264/328.1; 524/188; 524/262; 524/264
(58) Field of Search ................................. 264/108, 328.1, 264/140; 524/188, 262, 264

(56) References Cited

U.S. PATENT DOCUMENTS

| | | | | |
|---|---|---|---|---|
| 4,489,190 | * | 12/1984 | Froix | 524/539 |
| 4,728,698 | * | 3/1988 | Isayev et al. | 264/108 |
| 5,075,381 | * | 12/1991 | Gotoh et al. | 525/189 |
| 5,225,488 | * | 7/1993 | Baird et al. | 525/132 |
| 5,260,380 | * | 11/1993 | Isayev | 525/177 |
| 5,514,739 | * | 5/1996 | Aketa et al. | 524/108 |
| 5,883,192 | * | 3/1999 | Natori et al. | 525/98 |

FOREIGN PATENT DOCUMENTS

| | | |
|---|---|---|
| 0 568 945 A1 | 11/1993 | (EP) . |
| 3-179051 | 8/1991 | (JP) . |
| 4-213353 | 8/1992 | (JP) . |
| 4-318058 | 11/1992 | (JP) . |
| 5-117505 | 5/1993 | (JP) . |

OTHER PUBLICATIONS

Co8L67/00+B; Injection–Moulded Blends of a Thermotropic Liqauid Crystallie Polymer with Polyethylene Terephthalate, Polypropylene, and Polyphenylene Sulfide; Jukka Seppäl, et al., Helsinki University of Technology, Department of chemical Engineering, Kemistintie 1 SF–02150 Espoo, Finland; pp. 1051–1060.

* cited by examiner

Primary Examiner—Jill L. Heitbrink
Assistant Examiner—Suzanne E. McDowell
(74) Attorney, Agent, or Firm—Nixon & Vanderhye P.C.

(57) ABSTRACT

To provide a blended resin composition which comprises a thermoplastic resin which does not exhibit anisotropy in a molten state, such as a polyester resin, and a liquid-crystal polyester resin, and a resin composition which is reduced in delamination excellent in mechanical properties by blending 100 parts by weight of a resin component comprising 99 to 50 parts by weight of a thermoplastic resin (a) which does not exhibit anisotropy in a molten state and 1 to 50 parts by weight of a liquid-crystal polyester resin (b) capable of forming an anisotropic molten phase with 0.01 to 3.0 parts by weight of at least one silane compound (c) selected from among vinylalkoxysilanes, aminoalkoxysilanes and mercaptoalkoxysilanes.

7 Claims, No Drawings

SYNTHETIC RESIN COMPOSITION AND MOLDED ARTICLE THEREOF

BACKGROUND OF THE INVENTION

1. Field of the Invention

The present invention relates to a blended resin composition comprising a thermoplastic resin which does not exhibit anisotropy in a molten state, such as a polyester resin, and a liquid-crystal polyester resin; and a molding thereof. More particularly, it relates to a resin composition as described above which is reduced in delamination and is excellent in mechanical properties; and a molding thereof.

2 Description of Related Art

A liquid-crystal polyester resin capable of forming an anisotropic molten phase is a thermoplastic resin exhibiting many excellent characteristics such as high strength, high rigidity, high heat resistance, excellent moldability due to high melt flow, and so on. However, it has also disadvantages such as anisotropy in the mechanical properties and expensiveness. On the other hand, a thermoplastic resin not forming any anisotropic molten phases is relatively inexpensive and little exhibits anisotropy in the mechanical properties, but is poor in mechanical properties, heat resistance and so on disadvantageously.

Under these circumstances, attempts have been made to use blends of both of the above resins with the purposes of utilizing the advantages of both of the resins and making up for the faults thereof. For example, JP-A 5-70700 and JP-A 5-112709 have proposed processes which comprise extruding a blend comprising a liquid-crystal polyester resin and a thermoplastic resin not forming any anisotropic molten phase under stretching at a temperature at which both of the resins can be melted to thereby prepare a molding material wherein the liquid-crystal polyester resin is present in the form of fibers having a large aspect ratio, and molding this molding material at a temperature at which the thermoplastic resin can be melted but the liquid-crystal polyester resin cannot be melted to thereby form a product of molding wherein the liquid-crystal polyester resin is contained in a fibrous state and therefore acts as a reinforcement.

Further, another process has also been proposed, which comprises injection-molding a blend comprising a liquid-crystal polyester resin and a thermoplastic resin not forming any anisotropic molten phase at a temperature not lower than the fluidization-starting temperatures of both of the resins under specific molding conditions to thereby orient the liquid-crystal polyester resin in a fibrous state, thus giving a product of molding excellent in physical properties such as rigidity, strength and so on.

However, the products of molding produced by the above processes are disadvantageous because they are liable to cause delamination owing to their poor interfacial strength between the liquid-crystal polyester resin and the resin not forming any anisotropic molten phase, and they cannot safely be said to be satisfactory in mechanical strengths.

DISCLOSURE OF THE INVENTION

Summary of the Invention

The present invention aims at providing a resin composition which comprises a liquid-crystal polyester exhibiting anisotropy in a molten state and a thermoplastic resin not exhibiting anisotropy in a molten state, such as a polyester, and which is reduced in delamination and is excellent in mechanical properties; and a molding thereof.

The inventors of the present invention have intensively studied in view of the above problems and have found that the objective composition can be obtained by reducing the delamination of a blend comprising a thermoplastic resin and a liquid-crystal polyester resin by the simultaneous use of a specific silane compound and improving the physical properties, such as rigidity and strength, of the blend by forming the liquid-crystal polyester resin into fibers. The present invention has been accomplished on the basis of this finding.

Namely, the present invention relates to a synthetic resin composition produced by blending 100 parts by weight of a resin component comprising 99 to 50 parts by weight of a thermoplastic resin (a) which does not exhibit anisotropy in a molten state and 1 to 50 parts by weight of a liquid-crystal polyester resin (b) capable of forming an anisotropic molten phase with 0.01 to 3.0 parts by weight of at least one silane compound (c) selected from among vinylalkoxysilanes, aminoalkoxy-silanes and mercaptoalkoxysilanes; and a molding thereof. In short, the present invention relates to a composition comprising the components (a), (b) and (c) which are well blended with each other.

The constitution of the present invention will now be described in detail.

DETAILED DESCRIPTION OF THE INVENTION

The thermoplastic resin which does not exhibit anisotropy in a molten state to be used in the present invention as the component (a) may be any conventional thermoplastic one. However, the use of a polymer resin having an ester, amide, imide, urethane, carboxyl, hydroxyl, amino or mercapto group in the main chain o r at the end(s) is preferable, because it is remarkably effective in reducing the delamination and in improving the mechanical properties. Specific examples of such a resin include polyester resins such as polyethylene terephthalate, polybutylene terephthalate and polycarbonate; polyamides such as nylons 6 and 66; polyimides; polyurethanes; polyphenylene oxide, polysulfone, poly(ether sulfone), poly(ether ether ketone) and polyoxymethylene which have hydroxyl group(s) at the end(s); polyphenylene sulfides having mercapto group(s) at the end(s); and polymethyl methacrylate, polymethyl acrylate and polyvinyl acetate which have ester groups in the main chain; and copolymers comprising two or more of these polymers. Among them, polyester resins are preferable.

The liquid-crystal polyester resin to be used in the present invention as the component (b) is a melt-processable polyester having the property that the polymeric molecular chains take a regular parallel arrangement in the molten state. Such an arranged state of molecules is sometimes called "liquid-crystal state".

The presence of an anisotropic molten phase can be ascertained by a conventional test with polarized light using crossed nicols. Precisely, it can be ascertained by observing a molten sample put on a Leitz hot stage in a nitrogen atmosphere under a Leitz polarization microscope (40× magnification). When examined between the nicols, the polymer according to the present invention can transmit polarized light even in a static molten state, thus exhibiting optical anisotropy.

Liquid-crystal polyester resins suitably usable in the present invention are substantially insoluble in usual solvents and therefore unfit for solution processing. As described above, however, such polymers can easily be melt-processed by conventional means. The polymer capable of forming an anisotropic molten phase to be used in the present invention is preferably an aromatic polyester, an aromatic polyester amide or a polyester comprising part of both of them in one molecular chain.

Particularly preferably is a liquid-crystal aromatic polyester or polyester amide containing constituent units derived from at least one member selected from the group consisting of aromatic hydroxy carboxylic acids, aromatic hydroxyamines and aromatic diamines.

More specific examples include
1) polyesters prepared mainly from one or more members selected from among aromatic hydroxy carboxylic acids and derivatives thereof;
2) polyesters prepared mainly from
   a) one or more members selected from among aromatic hydroxy carboxylic acids and derivatives thereof
   b) one or more members selected from among aromatic dicarboxylic acids, alicyclic dicarboxylic acids and derivatives thereof, and
   c) one or more members selected from among aromatic diols, alicyclic diols, a liphatic diols and derivatives thereof;
3) polyester amides prepared mainly from
   a) one or more members selected from among aromatic hydroxy carboxylic acids and derivatives thereof,
   b) one or more members selected from among aromatic hydroxyamines, aromatic diamines and derivatives thereof, and
   c) one or more members selected from among aromatic dicarboxylic acids, alicyclic dicarboxylic acids and derivatives thereof; and
4) polyester amides prepared mainly from
   a) one or more members selected from among aromatic hydroxy carboxylic acids and derivatives thereof ,
   b) one or more members selected from among aromatic hydroxyamines, aromatic diamines and derivatives thereof,
   c) one or more members selected from among aromatic dicarboxylic acids, alicyclic dicarboxylic acids and derivatives thereof, and
   d) one or more members selected from among aromatic diols, alicyclic diols, aliphatic diols and derivatives thereof.

If necessary, a molecular weight modifier may be used in addition to the above monomer components.

Preferred examples of the specific compounds constituting the liquid-crystal polyester according to the present invention include naphthalene compounds such as 2, 6-naphthalenedicarboxylic acid, 2, 6-dihydroxynaphthalene, 1,4-dihydroxynaphthalene and 6-hydroxy-2-naphthoic acid; biphenyl compounds such as 4,4'-diphenyldicarboxylic acid and 4,4'-dihydroxybiphenyl; benzene compounds substituted at two positions para to each other, such as p-hydroxybenzoic acid, terephthalic acid, hydroquinone, p-aminophenol and p-phenylenediamine; ring-substituted derivatives thereof (wherein the substituent is selected from among chloro, bromo, methyl, phenyl and 1-phenylethyl); benzene compounds substituted at two positions meta to each other, such as isophthalic acid and resorcinol; and compounds represented by the following general formulae (I), (II) and (III):

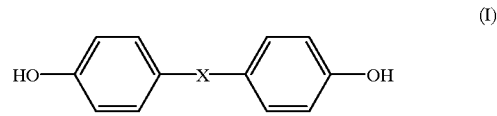

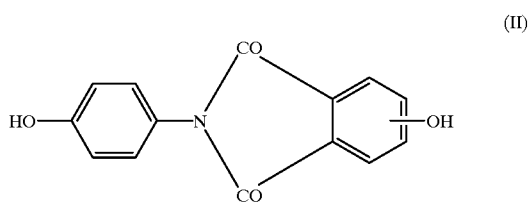

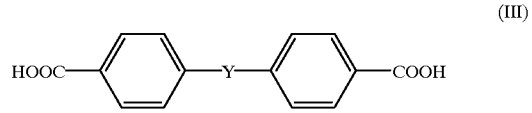

wherein X is a group selected from among alkylene ($C_1$–$C_4$). alkylidene, —O—, —SO—, —$SO_2$—, —S— and —CO—; and Y is a group selected from among —$(CH_2)_n$— (n being 1 to 4) and —$O(CH_2)_nO$— (n being 1 to 4).

Further, the liquid-crystal polyester (b) to be used in the present invention may be one which partially contains a polyalkylene terephthalate or polyalkylene naphthalate moiety not forming any anisotropic molten phase in addition to the above constituent units in one molecular chain. In this case, the number of carbon atoms of the alkyl group is 2 to 4 and polyethylene terephthalate is particularly preferable.

Among the above components, it is still preferable to use as the essential constituent component (s) one or two members selected from among naphthalene compounds, biphenyl compounds and benzene compounds substituted at two positions para to each other. Among benzene compounds substituted at two positions para to each other, it is particularly preferable to use p-hydroxybenzoic acid, methylhydroquinone or 1-phenylethylhydroquinone.

In the present invention, the amount of the liquid-crystal polyester resin (b) to be blended with the thermoplastic resin (a) is 1 to 50 parts by weight, preferably 5 to 35 parts by weight, with the sum total of the resins (a) and (b) being 100 parts by weight.

When the ratio of the thermoplastic resin (a) to the liquid-crystal polyester resin (b) lies within the range of the present invention, the liquid-crystal polyester resin can be formed into fibers and exhibit a substantial reinforcing effect, and the properties of the composition is superior to that of the one prepared only by the thermoplastic resin (a) not forming any anisotropic molten phases. Further, when the proportion of the liquid-crystal polyester resin (b) lies within the range of the present invention, the domains of the blend are made of the liquid-crystal polyester resin (b) and the resin (b) is present in a fibrous state.

Then, the silane compound to be used in the present invention as the component (c) is one or more members selected from among vinylalkoxysilanes, aminoalkoxysilanes and mercaptoalkoxysilanes. Examples of the vinylalkoxysilanes include vinyltriethoxysilane, vinyltrimethoxysilane and vinyltris(β-methoxyethoxy)silane; those of the aminoalkoxysilanes include γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, and N-phenyl-γ-aminopropyltrimethoxysilane; and those of mercapto-alkoxysilanes include γ-mercaptopropyltrimethoxysilane and γ-mercaptopropyltriethoxysilane.

The amount of the silane compound (c) to be added is 0.01 to 3.0 parts by weight, preferably 0.03 to 1.5 parts by weight per 100 parts by weight of the resin component comprising the components (A) and (B).

When the amount of the silane compound (c) is less than 0.01 part by weight, the resulting composition will little be improved in delamination, modulus of elasticity and strength, while when it exceeds 3.0 parts by weight, the resulting composition will also be poor in modulus of elasticity and strength unfavorably.

The synthetic resin composition of the present invention may further contain various fibrous, powdery and flaky inorganic fillers in accordance with the purpose of use.

The fibrous fillers include inorganic fibrous substances such as glass fiber, asbestos fiber, silica fiber, silica/alumina fiber, alumina fiber, zirconia fiber, boron nitride fiber, silicon nitride fiber, boron fiber, potassium titanate fiber, and fibers of metals such as stainless steel, aluminum, titanium, copper and brass.

The powdery fillers include carbon black; graphite; silica; ground quartz; glass bead; milled glass fiber; glass balloon; glass powder; silicates such as calcium silicate, aluminum silicate, kaolin, talc, clay, diatomaceous earth and wollastonite; metal oxides such as iron oxide, titanium oxide, zinc oxide, antimony trioxide and alumina; metal sulfates such as calcium carbonate and magnesium carbonate; ferrite; silicon carbide; silicon nitride; boron nitride; and various metal powders.

Further, the flaky fillers include mica, glass flakes and various metal foils. These inorganic fillers may be used alone or as a mixture of two or more of them.

In the present invention, a known surface treatment may be used simultaneously with the inorganic filler in accordance with prescribed physical properties. The surface treatment includes functional compounds such as epoxy, isocyanate, titanate and silane compounds.

The amount of the inorganic filler to be added is 1 to 200 parts by weight, particularly preferably 1 to 100 parts by weight per 100 parts by weight of the resin component comprising the components (a) and (b).

The halogen-containing organic compound to be used in the present invention is not particularly limited and may be any ordinary one useful as flame retardant. Examples thereof include phenyl halides, halogenated diphenyl ethers, halogenated aromatic bisimide compounds, halogenated aromatic epoxy compounds, low-molecular-weight organic halides of bisphenol A and so on, halogenated polycarbonates, halogenated benzyl acrylates, and halogenated polystyrenes. Among these halogenated compounds, brominated ones are preferable. Further, these flame retardants may be used alone or as a mixture of two or more of them.

Although the object of the present invention can be attained by using any of the above halogen-containing organic compounds, the use of halogenated polycarbonates is preferable, with that of brominated polycarbonate (brominated PC) being particularly preferable.

The antimony compound or phosphate salt to be used in the present invention is one which exhibits the effect of enhancing the flame retardance synergistically when used together with the above halogen-containing organic compound.

Specific examples of the antimony compound include antimony trioxide, antimony tetraoxide, antimony pentaoxide and sodium antimonic acid. Examples of the phosphate salt include metaphosphates, orthophosphates and hydrogenorthophosphates. Among these compounds, antimony trioxide is preferable.

The amount of the halogen-containing organic compound to be added is 0.1 to 20 parts by weight, preferably 0.5 to 10 parts by weight, still preferably 1.0 to 5.0 parts by weight per 100 parts by weight of the resin component comprising the components (a) and (b). When the amount of the halogen-containing organic compound is less than 0.1 part by weight, the resulting composition will little be improved in flame retardance, while when it exceeds 20 parts by weight, the resulting composition will be remarkably poor in mechanical characteristics.

The amount of the antimony compound or phosphate salt to be added is 1.0 to 10 parts by weight, preferably 1.5 to 5 parts by weight, still preferably 1.5 to 2.0 parts by weight per 100 parts by weight of the resin component comprising the components (a) and (b). When the amount of the antimony compound or phosphate salt is less than 1.0 part by weight, the resulting composition will be poor in flame retardance, while when it exceeds 10 parts by weight, the resulting composition will be poor in mechanical characteristics unfavorably.

Further, it is preferable that the mixing proportion of the halogen-containing organic compound to the antimony compound or phosphate salt be regulated so as to give a mole ratio of the halogen contained in the halogen-containing organic compound to the antimony or phosphorus contained in the antimony compound or phosphate salt of about 3:1.

In the product of molding of the synthetic resin composition according to the present invention, it is preferable that the liquid-crystal polyester resin (b) capable of forming an anisotropic molten phase be micro-dispersed in the matrix of the thermoplastic resin (a) not forming any anisotropic molten phase in the form of fibers having an aspect ratio of at least 6. The liquid-crystal polyester resin micro-dispersed in such a state serves as a fibrous reinforcement, which enables the reinforcement of the thermoplastic resin to give a molding excellent in mechanical properties. The term "fiber" used in this description refers to "a fibrous or acicular structure having an aspect ratio of at least 6", this fibrous structure including ones having branches.

In order to form the liquid-crystal polyester resin into fibers in molding, it is preferable to add a phosphorus compound to the composition. When the thermoplastic resin not forming an any anisotropic molten phase is a polyester resin, particularly polycarbonate resin, the liquid-crystal polyester resin cannot often be dispersed in the matrix of the polycarbonate resin in the form of islands and therefore cannot be formed into fibers during the molding of the composition. The use of a phosphorus compound is remarkably effective in such a case. The phosphorus compound to be used in this case includes phosphides, phosphoric acid compoundis, phosphorous acid compounds and so on. Specific examples thereof include tetrakis(2,4-di-t-butylphenyl)-4,4'-biphenylenephosphonite, bis(2,6-di-t-butyl-4-methylphenyl)pentaerythritol diphosphite, bis(2,4,6-di-t-butylphenyl) pentaerythritol diphosphite and tris(2,4-di-t-butylphenyl) phosphite. Among these compounds, phosphorous acid compounds are preferable and pentaerythritol-type phosphorous acid compounds are particularly preferable.

The amount of the phosphorus compound to be added is 0.01 to 3.0 parts by weight, preferably 0.01 to 1.0 part by weight, still preferably 0.1 to 0.5 part by weight per 100 parts by weight of the sum total of the components (a) and (b). When the amount is less than 0.01 part by weight, the formation of the polyester resin into fibers will often be difficult, while when it exceeds 3.0 parts by weight, a large amount of gas of the phosphorus compound will generate to impair the mechanical strengths and moldability.

The synthetic resin composition of the present invention may further contain additives such as heat stabilizer, ultraviolet absorber and lubricant; additives for imparting flame retardance, such as bromine-containing organic compounds and antimony trioxide; and so on in accordance with the purpose of use.

Next, the process for producing a molding wherein the liquid-crystal polyester resin (b) capable of forming an anisotropic molten phase is micro-dispersed in the matrix of the thermoplastic resin (a) not forming any anisotropic molten phases in the form of fibers includes (1) a process which comprises kneading the resin (a) and the resin (b) by the use of a conventional extruding machine and injection-molding the resulting composition at a temperature not lower than the fluidization-starting temperature of the liquid-crystal polyester resin (b) capable of forming an anisotropic molten phases, preferably higher than it by 10° C. or more, and not lower than the fluidization-starting temperature of the thermoplastic resin (a) not forming any anisotropic molten phases, preferably higher than it by 10° C. or more to produce the above molding by the shearing force due to the injection molding; and (2) a process which comprises melt-kneading the components according to the present invention at a temperature at which both of the components (a) and (b) are melt-processable, pelletizing the kneaded composition with the formation of the liquid-crystal polyester resin (b) capable of forming an anisotropic molten phase into fibers having an aspect ratio of at least 6, and molding the pellets at a temperature lower than the fluidization-starting temperature of the liquid-crystal polyester resin (b) capable of forming an anisotropic molten phase, preferably by 10° C. or more, and not lower than the fluidization-starting temperature of the thermoplastic resin (a) not forming any anisotropic molten phases, preferably higher than it by 10° C. or more.

The formation of the liquid-crystal polyester resin (b) capable of forming an anisotropic molten phase into such fibers in pelletizing can easily be attained by the use of a conventional extruder permitting melt-kneading and by adjusting the take-off speed of the strand so as to give a ratio of the die diameter to the strand diameter (i.e., die diameter/strand diameter) of 1 or below, preferably 0.3 or below. The process of forming the resin (b) into fibers in pelletizing makes it possible to produce a molding containing the liquid-crystal polyester resin in the form of fibers not only by injection molding but also by any molding process wherein only a low shearing force is exerted, for example, extrusion into relatively thick products or blow molding.

The term "fluidization-starting temperature" refers to a temperature at which a resin begins to flow by an external force as observed under temperature-rise conditions, and it can be determined by the method which will be described below.

EXAMPLE

The present invention will now be described in more detail by referring to the following Examples, though the present invention is not limited to them.

The methods for evaluation are as follows.

Flexural Modulus and Flexural Strength

The flexural modulus ($kg/cm^2$) and flexural strength ($kg/cm^2$) of each composition were determined according to ASTM D 790.

Fluidization-starting Temperature

Expressed in terms of the temperature at which a sample resin exhibits a melt-viscosity of 48000 P as determined by the use of a capillary rheometer (mfd. by Shimadzu Corporation, flow tester CFT-500) by heating the resin at a temperature rise rate of 4° C./min and extruding it through a nozzle having an inner diameter of 1 mm and a length of 10 mm under a load of 100 $kg/cm^2$. The fluidization-starting temperatures of several resins are given in Table 5.

Example 1

PBT-1 (the detail being described below, the same applies hereinafter), LCP-2, phosphite ester 1 and silane compound 1 were blended with each other at a weight ratio specified in Table 1, melt-kneaded by the use of a twin-screw extruder having a screw diameter of 30 mm at a resin temperature (extrusion temperature) of 265° C. and pelletized. The obtained pellets were injection-molded into test pieces at a resin temperature (molding temperature) of 265° C. and examined for flexural strength and flexural modulus according to ASTM D790. The test piece used in the determination of flexural properties was cut in such a way that a section parallel to the direction of flow appears, and the section was subjected to mirror polishing. The resulting section was observed under an electron microscope to evaluate the mean aspect ratio of the LCP component. More precisely, fifty arbitrarily selected LCD domains were examined for the length/diameter ratio and the mean of the ratios thus determined was calculated. The length and diameter were determined by measuring those which can be observed in the section. The evaluation was conducted according to the following criteria:

| | |
|---|---|
| the mean aspect ratio is 6 or above | ○ |
| the mean aspect ratio is less than 6 | X |

Further, a pressure-sensitive adhesive tape was applied on the test piece used in the determination of flexural properties, and peeled therefrom to evaluate the quantity of the resin peeled off the piece according to the following three criteria:

| | |
|---|---|
| below 0.5 cm² | ○ |
| 0.5 cm² or above but *below 1.0 cm² | Δ |
| 1.0 cm² or above | X |

The proportions of the components, temperatures of melt-kneading and injection molding, and results of evaluation were given in Table 1.

Examples 2 to 10

The same processing and evaluation procedures as those of Example 1 were repeated except that the composition and the temperatures of melt kneading and injection molding were changed as specified in Tables 1 and 2. The results are given in Tables 1 and 2.

Example 11

The same processing and evaluation procedures as those of Example 1 were repeated except that LCP-2 was replaced by LCP-1, that the melt kneading temperature (extrusion temperature) was changed to 290° C., that the pelletization was conducted at such a take-off speed of strand as to give a strand diameter of at most 30% of the die diameter, and that the pellets were injection-molded at a molding temperature of 240° C. Similarly to the above evaluation of a molding for aspect ratio, the pellet obtained in this Example was also cut in such a way that a section parallel to the direction of extrusion appears and the section was subjected to mirror polishing and then observed under an electron microscope to evaluate the mean aspect ratio of the LCP component. More precisely, fifty arbitrarily selected LCD domains were examined for length/diameter ratio, and the mean of the ratios thus obtained was calculated. The length and diameter were determined by measuring those which can be observed in the section. The evaluation was conducted according to the following criteria:

| | |
|---|---|
| the mean aspect ratio is 6 or above | ○ |
| the mean aspect ratio is below 6 | X |

The results are given in Table 3.

Examples 12 and 13

The same processing and evaluation procedures as those of Example 11 were repeated except that the formula was changed to one specified in Table 3 and that the temperatures of melt kneading and injection molding were changed to those specified in Table 1. The results are given in Table 3.

Example 14

The same processing and evaluation procedures as those of Example 1 were repeated except that glass fiber 1 was further added to the same composition as that of Example 1 in an amount of 15 parts by weight per 100 parts by weight of the resin component. The results are given in Table 4.

Example 15

The same processing and evaluation procedures as those of Example 1 were repeated except that glass fiber 1 was further added to the same composition as that of Example 6 in an amount of 15 parts by weight per 100 parts by weight of the resin component. The results are given in Table 4.

Comparative Examples 1 to 12

The same processing and evaluation procedures as those of each of Examples 1 to 15 were repeated except that no silane compound was used as shown in Tables 1 to 4. The results are given in Tables 1 to 4.

Examples 16 and 17

The same processing and evaluation procedures as those of Example 1 were repeated except that brominated PC and antimony trioxide were added at weight ratios specified in Table 4 and that other components and their proportions were changed into those specified in Table 5. The results are given in Table 5.

Flammability Test

The test pieces obtained in Examples 16 and 17 were examined for flammability according to UL 94 flammability test with a 1/64-inch test piece.

TABLE 1

|  | Ex. 1 | Ex. 2 | Ex. 3 | Ex. 4 | Comp. Ex. 1 | Ex. 5 | Comp. Ex. 2 | Ex. 6 | Comp. Ex. 3. | Ex. 7 | Comp. Ex. 4 |
|---|---|---|---|---|---|---|---|---|---|---|---|
| Compn. (pt. wt.) | | | | | | | | | | | |
| PBT-1 | 80 | 80 | 80 | 80 | 80 | — | — | — | — | — | — |
| PET-1 | — | — | — | — | — | 80 | 80 | — | — | — | — |
| PC-1 | — | — | — | — | — | — | — | 80 | 80 | — | — |
| PPS-1 | — | — | — | — | — | — | — | — | — | 80 | 80 |
| LCP-1 | — | — | — | — | — | — | — | 20 | 20 | 20 | 20 |
| LCP-2 | 20 | 20 | 20 | 20 | 20 | 20 | 20 | — | — | — | — |
| phosphite ester 1 | 0.2 | 0.2 | 0.2 | 0.2 | 0.2 | 0.2 | 0.2 | 0.2 | 0.2 | 0.2 | 0.2 |
| silane compd. 1 | 0.1 | — | — | — | — | 0.1 | — | 0.1 | — | 0.1 | — |
| silane compd. 2 | — | 0.8 | — | — | — | — | — | — | — | — | — |
| silane compd. 3 | — | — | 1.0 | — | — | — | — | — | — | — | — |
| silane compd. 4 | — | — | — | 1.0 | — | — | — | — | — | — | — |
| Molding condn. and evaluation | | | | | | | | | | | |
| extrusion temp. | 265 | 265 | 265 | 265 | 265 | 275 | 275 | 300 | 300 | 300 | 300 |
| molding temp. | 265 | 265 | 265 | 265 | 265 | 275 | 275 | 300 | 300 | 300 | 300 |
| flexural modulus (kg/cm$^2$) | 63000 | 61000 | 63000 | 60000 | 57000 | 58000 | 53000 | 66000 | 60000 | 58000 | 54000 |
| flexural strength (kg/cm$^2$) | 1320 | 1300 | 1300 | 1290 | 1260 | 1270 | 1180 | 1410 | 1290 | 1180 | 1150 |
| aspect ratio of molding (6 or more/○) | ○ | ○ | ○ | ○ | ○ | ○ | ○ | ○ | ○ | ○ | ○ |
| delamination | ○ | ○ | ○ | ○ | X | ○ | X | ○ | X | ○ | X |

TABLE 2

|  | Ex. 8 | Comp. Ex. 5 | Ex. 9 | Comp. Ex. 6 | Ex. 10 | Comp. Ex. 7 |
|---|---|---|---|---|---|---|
| Compn. (pt. wt.) | | | | | | |
| POM-1 | 90 | 90 | — | — | — | — |
| PPO-1 | — | — | 90 | 90 | — | — |
| PAR-1 | — | — | — | — | 70 | 70 |
| LCP-1 | — | — | — | — | 30 | 30 |
| LCP-2 | — | — | 10 | 10 | — | — |
| LCP-3 | 10 | 10 | — | — | — | — |
| phosphite ester 1 | 0.2 | 0.2 | 0.2 | 0.2 | 0.2 | 0.2 |
| silane compd. 1 | 0.1 | — | 0.1 | — | 0.1 | — |
| Molding condn. and evaluation | | | | | | |
| extrusion temp. | 200 | 200 | 280 | 280 | 310 | 310 |
| molding temp. | 200 | 200 | 280 | 280 | 310 | 310 |
| flexural modulus (kg/cm$^2$) | 45000 | 41000 | 44000 | 40000 | 71000 | 66000 |
| flexural strength (kg/cm$^2$) | 1200 | 1150 | 1210 | 1120 | 1480 | 1390 |
| aspect ratio of molding (6 or more/○) | ○ | ○ | ○ | ○ | ○ | ○ |
| delamination | ○ | X | ○ | X | ○ | X |

TABLE 3

|  | Comp. Ex. 11 | Comp. Ex. 8 | Ex. 12 | Comp. Ex. 9 | Ex. 13 | Comp. Ex. 10 |
|---|---|---|---|---|---|---|
| Compn. (pt. wt.) | | | | | | |
| PBT-1 | 80 | 80 | — | — | — | — |
| PC-1 | — | — | 80 | 80 | — | — |
| PAR-1 | — | — | — | — | 70 | 70 |
| LCP-1 | 20 | 20 | 20 | 20 | — | — |
| LCP-4 | — | — | — | — | 30 | 30 |
| phosphite ester 1 | 0.2 | 0.2 | 0.2 | 0.2 | 0.2 | 0.2 |
| silane compd. 1 | 0.1 | — | 0.1 | — | 0.1 | — |
| Molding condn. and evaluation | | | | | | |
| extrusion temp. | 290 | 290 | 300 | 300 | 350 | 350 |
| molding temp. | 240 | 240 | 250 | 250 | 270 | 270 |
| aspect ratio of pellet (6 or more/○) | ○ | ○ | ○ | ○ | ○ | ○ |
| flexural modulus (kg/cm$^2$) | 55000 | 52000 | 58000 | 51000 | 69000 | 65000 |
| flexural strength (kg/cm$^2$) | 1270 | 1140 | 1290 | 1070 | 1400 | 1310 |
| aspect ratio of molding (6 or more/○) | ○ | ○ | ○ | ○ | ○ | ○ |
| delamination | ○ | Δ | ○ | Δ | ○ | Δ |

TABLE 4

|  | Ex. 14 | Comp. Ex. 11 | Ex. 15 | Comp. Ex. 12 |
|---|---|---|---|---|
| Compn. (pt. wt.) | | | | |
| PBT-1 | 80 | 80 | — | — |
| PC-1 | — | — | 80 | 80 |
| LCP-1 | — | — | 20 | 20 |
| LCP-2 | 20 | 20 | — | — |
| phosphite ester 1 | 0.2 | 0.2 | 0.2 | 0.2 |
| silane compd. 1 | 0.1 | — | 0.1 | — |
| glass fiber 1 | 15 | 15 | 15 | 15 |
| Molding condn. and evaluation | | | | |
| extrusion temp. | 265 | 265 | 300 | 300 |
| molding temp. | 265 | 265 | 300 | 300 |
| flexural modulus (kg/cm$^2$) | 78000 | 73000 | 86000 | 76000 |
| flexural strength (kg/cm$^2$) | 1420 | 1350 | 1540 | 1430 |
| aspect ratio (6 or more/○) | ○ | ○ | ○ | ○ |
| delamination | ○ | X | ○ | X |

TABLE 5

|  |  | Ex. 16 | Ex. 17 |
|---|---|---|---|
| Compn. (pt. wt.) | PC-1 | 80 | 80 |
|  | LCP-1 | 20 | 20 |
|  | phosphite ester 1 | 0.2 | 0.2 |
|  | silane compd. 1 | 0.1 | 0.1 |
|  | brominated PC | 5.0 | 2.5 |
|  | antimony trioxide | 1.5 | 1.0 |
| Molding condn. and evaluation | extrusion temp. | 300 | 300 |
|  | molding temp. | 300 | 300 |
|  | flexural modulus (kg/cm$^2$) | 64000 | 65000 |
|  | flexural strength (kg/cm$^2$) | 1380 | 1400 |
|  | aspect ratio (6 or more/○) | ○ | ○ |
|  | delamination | ○ | ○ |
|  | flammability | V-O | V-O |

TABLE 6

|  | Fluidization-starting temp. (° C.) |
|---|---|
| PBT-1: a product of Polyplastics Co., Ltd., Duranex 600 FP | 237 |
| PET-1: a product of Kanegafuchi Chemical Industry Co., Ltd., Bellpet EFG-1 | 269 |
| PC-1: a product of Mitsubishi Gas Chemical Co., Inc., Upilon H-3000 | 185 |
| PPS-1: a product of Kureha Chemical Industry Co., Ltd., Fortron, melt viscosity: 1500 P (310° C., 1000 sec$^{-1}$) | 298 |
| POM-1: a product of Polyplastics Co., Ltd., Duracon M90-44 | 175 |
| PPO-1: a product of Mitsubishi Gas Chemical Co., Inc., Upiace AH-60 | 172 |
| PAR-1: a product of Unitika Ltd., U polymer U-1000 | 208 |
| LCP-1: a product of Polyplastics Co., Ltd., Vectra A950 | 265 |
| LCP-2: LCP having a molar hydroxybenzoic acid to 2,6-hydroxy-naphthoic acid ratio of 60/40 and a melt viscosity: 450 P (280° C., 1000 sec$^{-1}$) | 253 |
| LCP-3: a product of Unitika Ltd., Rodrun LC3000 | 182 |
| LCP-4: a product of Polyplastics Co., Ltd., Vectra E950 | 333 |
| phosphite ester 1: a product of Adeka Argus Chemical Co., Ltd., Adekastab PEP-36 | — |
| silane compd. 1: γ-aminopropyltriethoxysilane | — |
| silane compd. 2: γ-aminopropylmethyl-diethoxysilane | — |
| silane compd. 3: vinyltriethoxysilane | — |
| silane compd. 4: γ-mercaptopropyltriethoxysilane | — |
| glass fiber 1: a product of Nippon Electric Glass Co., Ltd., ECS03T187H | — |
| brominated PC: a product of Teijin Chemicals, Ltd., Fire Guard 7500 | — |
| antimony trioxide: a product of Nihon Mining & Concentrating Co., Ltd., ATOX-S | — |

PBT-1: polybutylene terephthalate 1
PET-1: polyethylene terephthalate 1
PC-1: polycarbonate
PPS-1: polyphenylene sulfide 1
POM-1: polyoxymethylene 1
PPO-1: polyphenylene oxide
PAR-1: polyarylate 1
LCP-1: liquid-crystal polyester resin 1
LCP-2: liquid-crystal polyester resin 2
LCP-3: liquid-crystal polyester resin 3
LCP-4: liquid-crystal polyester resin 4

All the Duranex, Bellpet, Upilon, Fortron, Duracon, Upiace, U polymer, Vectra, Rodrun and Adekastab mentioned are trade marks.

Industrial Applicability

As apparent from the above description and Examples, the resin composition and molding of the present invention are reduced in delamination and are excellent in modulus of elasticity and strength.

What is claimed is:

1. A synthetic resin composition comprised of 100 parts by weight of a resin component blend comprising:
   (a) 99 to 50 parts by weight of a thermoplastic polycarbonate resin which does not exhibit anisotropy in a molten state;
   (b) 1 to 50 parts by weight of a liquid-crystal polyester resin capable of forming an anisotropic molten phase; and
   (c) 0.01 to 3.0 parts by weight of at least one silane compound (c) selected from the group consisting of vinylalkoxysilanes, aminoalkoxysilanes and mercaptoalkoxysilanes; and wherein
   (d) said liquid crystal polyester resin (b) is in the form of fibers having an aspect ratio of 6 or greater dispersed in a matrix of the thermoplastic polycarbonate resin (a).

2. The synthetic resin composition according to claim 1, which further comprises 0.001 to 3.0 parts by weight of a phosphorus compound per 100 parts by weight of the resin component comprising the components (a) and (b).

3. The synthetic resin composition according to claim 1, which further comprises 1 to 200 parts by weight of an inorganic filler per 100 parts by weight of the resin component comprising the components (a) and (b).

4. The synthetic resin composition according to claim 1, comprising 0.1 to 20 parts by weight of a halogen-containing organic compound and 1.0 to 10 parts by weight of an antimony compound or a phosphate salt per 100 parts by weight of the resin component comprising the components (a) and (b).

5. The synthetic resin composition according to claim 4, wherein the halogen-containing organic compound is a brominated polycarbonate and the antimony compound is antimony trioxide.

6. A process for producing a molding comprised of 100 parts by weight of a resin component blend comprising:
   (a) 99 to 50 parts by weight of a thermoplastic polycarbonate resin which does not exhibit anisotropy in a molten state;
   (b) 1 to 50 parts by weight of a liquid-crystal polyester resin capable of forming an anisotropic molten phase; and
   (c) 0.01 to 3.0 parts by weight of at least one silane compound (c) selected from the group consisting of vinylalkoxysilanes, aminoalkoxysilanes and mercaptoalkoxysilanes; wherein
     said method comprises injection molding the resin component blend at a temperature not lower than the fluidization-starting temperature of the liquid-crystal polyester resin (b) capable of forming an anisotropic molten phase and not lower than that of the thermoplastic polycarbonate resin (a) which does not exhibit anisotropy to form fibers of said liquid crystal polyester resin (b) having an aspect ratio of 6 or greater dispersed in a matrix of the thermoplastic polycarbonate resin (a).

7. The process of claim 6, wherein said resin component blend is formed into pellets prior to said step of injection molding, and wherein said step of injection molding comprises using said pellets of said resin component blend.

* * * * *